US010838551B2

(12) United States Patent
Bassett et al.

(10) Patent No.: US 10,838,551 B2
(45) Date of Patent: Nov. 17, 2020

(54) CALIBRATION OF DISPLAYS

(71) Applicant: Hewlett-Packard Development Company, L.P., Houston, TX (US)

(72) Inventors: Jonathan D. Bassett, Ft. Collins, CO (US); Lauren Domingo, Ft. Collins, CO (US); Bruce E. Blaho, Ft. Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 51 days.

(21) Appl. No.: 15/427,703

(22) Filed: Feb. 8, 2017

(65) Prior Publication Data
US 2018/0225004 A1    Aug. 9, 2018

(51) Int. Cl.
*G06F 3/041* (2006.01)
*G06F 3/038* (2013.01)
*G06F 3/0354* (2013.01)

(52) U.S. Cl.
CPC .......... *G06F 3/0418* (2013.01); *G06F 3/0383* (2013.01); *G06F 3/03545* (2013.01)

(58) Field of Classification Search
CPC ... G06F 3/0418; G06F 3/0383; G06F 3/03545
See application file for complete search history.

(56) References Cited

U.S. PATENT DOCUMENTS

| 5,969,756 | A | * | 10/1999 | Buckley | H04N 17/04 348/190 |
| 7,158,122 | B2 | * | 1/2007 | Roberts | G06F 3/0414 178/18.02 |
| 7,362,315 | B2 | | 4/2008 | Homer et al. | |
| 7,536,051 | B2 | * | 5/2009 | Lin | G06K 9/222 382/181 |
| 7,646,380 | B2 | * | 1/2010 | Tsang | G06F 3/0418 178/18.02 |
| 7,656,396 | B2 | * | 2/2010 | Bosch | G06F 3/03545 345/156 |
| 8,539,383 | B2 | | 9/2013 | Zotov et al. | |
| 9,218,071 | B2 | | 12/2015 | Westhues | |
| 9,310,900 | B1 | * | 4/2016 | Kumar | G06F 3/03545 |
| 9,733,792 | B2 | * | 8/2017 | Song | G06F 3/03542 |
| 9,807,356 | B1 | * | 10/2017 | Minami | H04N 9/3155 |
| 2003/0189555 | A1 | * | 10/2003 | Yamashita | G06F 3/041 345/173 |
| 2005/0146518 | A1 | * | 7/2005 | Wang | G06F 3/03545 345/179 |

(Continued)

FOREIGN PATENT DOCUMENTS

| EP | 2743803 | 6/2014 |
| WO | 2016122626 | 8/2016 |

*Primary Examiner* — Jose R Soto Lopez
(74) *Attorney, Agent, or Firm* — Hanley Flight & Zimmerman LLC

(57) ABSTRACT

Calibration of displays are disclosed herein. An example method includes obtaining an image of a display including a position-determining pattern and pixels, the image including pixel location data and position-determining pattern location data; comparing the pixel location data and the position-determining pattern location data; and based on the comparison, determining calibration data that accounts for misalignment between the position-determining pattern and the pixels.

22 Claims, 17 Drawing Sheets

(56) References Cited

U.S. PATENT DOCUMENTS

| | | | |
|---|---|---|---|
| 2006/0250381 A1* | 11/2006 | Geaghan | G06F 3/03545 345/179 |
| 2008/0094376 A1* | 4/2008 | Dietz | G06F 3/0317 345/179 |
| 2008/0233360 A1* | 9/2008 | Sekine | B32B 38/145 428/195.1 |
| 2008/0252064 A1* | 10/2008 | Sekine | B42D 25/382 283/91 |
| 2009/0175530 A1* | 7/2009 | Sjostrom | G01N 21/956 382/152 |
| 2010/0128231 A1* | 5/2010 | Furui | G03B 21/53 353/70 |
| 2011/0109641 A1* | 5/2011 | Yoshida | G06F 3/0321 345/589 |
| 2011/0216091 A1* | 9/2011 | Song | G06F 3/033 345/634 |
| 2011/0291998 A1* | 12/2011 | Adams | G06F 3/0321 345/179 |
| 2012/0013632 A1* | 1/2012 | Yamamoto | G09G 5/00 345/589 |
| 2012/0263381 A1* | 10/2012 | Yoshida | G06F 3/0321 382/189 |
| 2013/0093733 A1* | 4/2013 | Yoshida | G06F 3/0321 345/179 |
| 2013/0162605 A1* | 6/2013 | Osakabe | G06F 3/03545 345/179 |
| 2013/0257813 A1* | 10/2013 | Chang | G06F 3/0425 345/175 |
| 2013/0265438 A1* | 10/2013 | Sugiyama | H04N 5/33 348/164 |
| 2013/0278550 A1* | 10/2013 | Westhues | G06F 3/0386 345/174 |
| 2013/0300703 A1* | 11/2013 | Sjogren | G06F 3/03545 345/173 |
| 2013/0314313 A1* | 11/2013 | Ericson | G06F 3/01 345/156 |
| 2014/0168173 A1* | 6/2014 | Idzik | G06F 3/0321 345/179 |
| 2015/0070328 A1* | 3/2015 | Yamaguchi | G02B 6/0051 345/175 |
| 2015/0124178 A1* | 5/2015 | Khan | G06F 1/1652 349/12 |
| 2015/0198751 A1* | 7/2015 | Kang | G02B 5/08 345/179 |
| 2017/0098146 A1* | 4/2017 | Sjogren | G06K 19/06046 |
| 2017/0278240 A1* | 9/2017 | Kato | G01B 11/002 |
| 2017/0351384 A1* | 12/2017 | Yin | G06F 3/0425 |
| 2019/0052848 A1* | 2/2019 | Minami | H04N 9/3185 |

* cited by examiner

CALIBRATION OF DISPLAYS

BACKGROUND

A digital pen or stylus may be used in connection with a display to enable a user to write, draw and/or create strokes on the display. To enable the position of the digital stylus relative to the display to be determined, some displays have a position-determining pattern encoded and/or positioned on a surface of the display.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
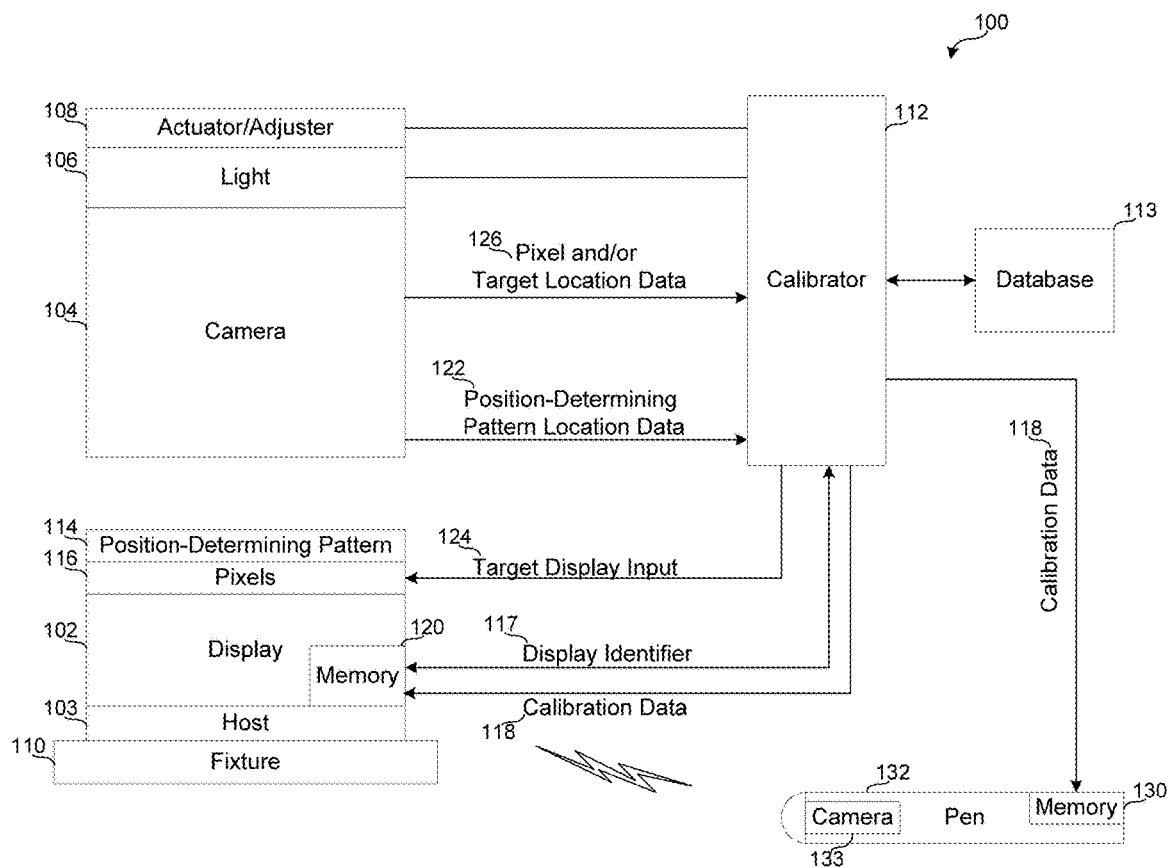
FIG. 1 is a schematic illustration of an example system used during an example calibration process to calibrate displays in accordance with the teachings of this disclosure.

The examples disclosed herein relate to calibrating displays to enable the substantially true-physical position of a stylus and/or digital pen to be rendered in substantially real-time on a writing surface of the display. As used herein, the phrase "substantially true-physical position" means within 0.25 millimeters (mm), 0.1 mm, 0.2 mm, 0.25 mm, 0.5 mm, 1 .mm, etc. of the true-physical position of the digital pen on the writing surface and the phrase "substantially real-time" accounts for transmission and processing delays. In some examples, to enable the physical position of the digital pen relative to the writing surface to be determined, the writing surface includes position-determining patterns that are read and/or identified by the digital pen and/or a camera of the digital pen. The position-determining pattern may be a non-repeating pattern that is formed using infrared absorbing ink on a panel and/or a laminate that is coupled to the writing surface.

While the position-determining pattern enables the position of the digital pen to be determined in relation to the position-determining pattern, misalignment between the position-determining pattern and pixels (liquid-crystal display (LCD) pixels) of the display may cause the strokes of the digital pen to be offset relative to the pixels when the strokes are rendered on the display. In other words, misalignment between the position-determining pattern and the pixels of the display may cause the strokes of the digital pen to be shown on the display in a location that is noticeably different than the intended location (e.g., 0.1 mm, 0.2 mm, 0.5 mm, 1.0 mm, 2.0 mm, etc. offset from the intended location).

To account for the misalignment between the position-determining pattern and the pixels of the display, the examples disclosed herein relate to determining calibration data that account for scaling, distortion, position and/or rotation of the position-determining pattern relative to the pixels of the display. In some examples, the calibration data is stored on a memory of the display to enable the display to be easily paired with different digital pens and/or workstations (e.g., hosts) throughout the useful life of the display. In some examples, the calibration data is stored in another location that is accessible by the digital pen such as, for example, an input/output (IO) device, a host (e.g., a computer) and/or a shared computer and/or server network (the cloud). Regardless of where the calibration data is stored, the calibration data may be associated with an identifier (e.g., a serial number) of the display.

In some examples, the calibration data is determined based on an offset between the position-determining pattern and the pixels of the display. To obtain pixel location data and/or position-determining pattern location data, in some examples, a camera(s) obtains an image(s) of the pixels of the display and/or a target(s) being emitted by the display and an image(s) of the position-determining pattern on the display. The camera that obtains the image(s) may be a camera different than the camera of a digital pen to be paired with the display. In other words, the camera(s) used during the calibration process may be used to calibrate different displays (e.g., hundreds of displays, thousands of displays) without the digital pens associated with the respective displays being involved in the calibration process.

In some examples, a single image is obtained that includes both the pixels of the display and/or the associated target(s) and the position-determining pattern on the display. In other examples, a first image is obtained that includes the pixels of the display and/or the associated target(s) and a second image is obtained that includes the position-determining pattern on the display. In either example, the image(s) may be obtained with the writing surface having an anti-reflective coating and/or a glass protection cover disposed overtop of the writing surface.

In some examples, when the camera(s) obtains the image, the display is disposed in a fixture and/or jig to substantially ensure consistent alignment between the display, the pixels and/or the camera(s). The fixture may include a receptacle and/or recess that is movable and/or formed as a drawer to enable the display to be easily positioned within the receptacle. However, in some examples, the receptacle and/or recess is fixed.

To obtain pixel and/or target location data and position-determining pattern location data from multiple locations on the writing surface of the display, in some examples, multiple cameras are fixed above the receptacle of the fixture. The position of the cameras may be adjustable using, for example, slotted apertures that receive fasteners to couple the cameras to the fixture. Additionally or alternatively, in other examples, an actuator and/or robotic arm is used to position a camera(s) at distinct locations when obtaining the image(s). While the above example describes a fixture being used when obtaining the image(s), any other type of arrangement may be used when obtaining images used in connection with calibrating the displays. For example, such images may be obtained using a camera of a mobile device and/or any device other than the camera of the digital pen. However, in some examples, the digital pen may be disposed (e.g., secured) in an example fixture to enable images to be obtained using a camera of the digital pen. In such examples, the digital pen may be coupled to an actuator and/or a robotic arm to enable the camera of the digital pen to be disposed at different locations relative to the display to obtain images.

In some examples, when performing the calibration process, the display emits a static target(s) at known pixel positions on the display to enable the location of the pixels to be determined. The static targets may be a crosshair pattern(s) or any other pattern on the display. In some examples, images of the position-determining pattern are obtained when illuminating the writing surface and/or exposing the writing surface to synchronized strobe lights and/or infrared light (e.g., 850 nanometer (nm) illuminations, light-emitting diodes (LED), LED strobes) to enable the position-determining pattern to be read and/or identified.

By comparing the images of the position-determining pattern and the images of the pixels and/or the associated target(s), the examples disclosed herein determine mechanical misalignments and/or offsets between the pixels and the position-determining pattern and use these determined misalignments and/or offsets to determine calibration data that account for the mechanical misalignments and/or offsets. Some examples disclosed herein may obtain the pixel location data and the position-determining pattern location data using a camera(s) that is different from a camera(s) on the digital pen itself. In other words, the calibration process as disclosed herein may be performed without the use of the digital pen. Further, some examples disclosed herein perform the calibration process prior to the customer receiving the display. Thus, the calibration process may be performed in a production and/or factory setting enabling an end-recipient to receive the display pre-calibrated.

In some examples, to enable a digital pen to be used with a display and for the position of the digital pen relative to the pixels of the display to be accurately decoded, the calibration data and/or a cached version thereof is accessed by the digital pen and/or applied to firmware of the digital pen. To determine whether calibration data for the display is stored on a memory of the digital pen, the digital pen accesses an identifier associated with the display and compares the accessed identifier with stored identifiers on the digital pen to determine if the accessed identifier is the same as one of the stored identifiers.

In examples in which the digital pen has previously been used with the display, the accessed identifier may be the same as one of the stored identifiers. Thus, in such examples, the digital pen may access the calibration data stored on the memory of the digital pen to enable the position of the digital pen relative to the display to be accurately determined. In examples in which the digital pen has not been previously used with the display and/or if the calibration data is not stored on a memory of the digital pen, the accessed identifier from the display may not be the same as one of the stored identifiers. Thus, in such examples, the digital pen accesses and/or stores the calibration data from the display and/or another source to enable the position of the digital pen relative to the display to be accurately decoded. In examples in which the digital pen is used with multiple displays, the digital pen may access first calibration data associated with a first display and second calibration data associated with a second display. Thus, using the examples disclosed herein, a single digital pen may be used with multiple displays each having different calibration data. In some examples, the calibration data may be stored on a computing device communicatively coupled to the digital pen, and the computing device may correct for the offset.

FIG. 1 illustrates an example calibration system 100 that can be used to calibrate displays in a cost-effective and efficient manner. In the illustrated example, the calibration system 100 performs tests on a display 102 and uses the results of the tests to determine calibration data for the display 102. In this example, the display 102 is coupled to a host (e.g., a computer) 103 that causes the display 102 to display images in operation. In other words, in the illustrated example, the display 102 and the host 103 are coupled to form, for example, a tablet, a phone, etc. However, in other examples, the display 102 is not coupled to the host 103 and/or the display 102 is remote relative to the host 103.

To enable the tests to be performed on the display 102, in the illustrated example, the calibration system 100 includes an example camera 104, an example light and/or strobe 106, an example actuator/adjuster 108, an example fixture 110 and an example calibrator 112 coupled to a database 113. In this example, the display 102 and the host 103 are shown being disposed within and/or coupled to the fixture 110.

In the example of FIG. 1, to perform the tests on the display 102 including obtaining images of an example position-determining pattern 114 and/or example pixels 116 of the display 102, the calibrator 112 causes the actuator/adjuster 108 to position the camera 104 and/or the light 106 above the display 102 at a distance where the images obtained are usable during the example calibration process. In some examples, the actuator/adjuster 108 includes an electromechanical actuator that moves the camera 104 and/or the light 106 relative to the display 102. In other examples, the actuator/adjuster 108 includes an oblong and/or oversized slot through which a fastener extends to enable a technician to manually adjust the camera 104 and/or the light 106 relative to the display 102.

In the illustrated example, to generate calibration data 118 for the display 102 that accounts for misalignment, scaling and/or distortion between the position-determining pattern 114 and the pixels 116 of the display 102, the display 102 and the host 103 are disposed within the fixture 110 and the calibrator 112 accesses a display identifier 117 from a memory 120 of the display 102. The display identifier 117 enables the calibrator 112 to associate the calibration data 118 and/or the calibration process performed with the display 102. In some examples, the display identifier 117 includes a serial number and/or other identifier associated with the display 102.

In the illustrated example, to obtain an image(s) of the position-determining pattern 114, the calibrator 112 determines that the display 102 is not on and/or is not emitting data and causes the light 106 to illuminate the position-determining pattern 114. In some examples, as the light 106 illuminates the position-determining pattern 114, the calibrator 112 causes the camera 104 to obtain an image of the position-determining pattern 114. In this example, the image of the position-determining pattern 114 is accessible by the calibrator 112 as position-determining pattern location data 122. Alternatively, the calibrator 112 processes the image to generate the position-determining pattern location data 122. In some examples, the light 106 emits synchronized strobe lights and/or infrared light that enables the position-determining pattern 114 to be detectable. The position-determining pattern 114 may be a non-repeating pattern formed using infrared absorbing ink applied to a panel and coupled to the display 102 and/or the pixels 116 using adhesive, for example.

In the illustrated example, to obtain an image(s) of the pixels 116 and/or an image that enables a location of the pixels 116 to be determined, the calibrator 112 generates a target display input 124 that causes the pixels 116 to emit a static target(s) at known pixel locations on the display 102. When the static target(s) is being emitted, the calibrator 112 causes the camera 104 to obtain an image of the target(s) being displayed. In this example, the image of the target(s) is accessible by the calibrator 112 as pixel and/or target location data 126. Alternatively, the calibrator 112 processes the image to generate pixel and/or target location data.

To generate the calibration data 118, in the illustrated example, the calibrator 112 compares the position-determining pattern location data 122 and the pixel and/or target location data 126 to identify any mechanical misalignments and/or offsets between the two. To compensate for any mechanical misalignments and/or offsets identified, the calibrator 112 generates and associates the calibration data 118 with the display identifier 117. The calibration data may include offsets at various positions on the display, a transformation, such as an affine transformation, for some or all of the display, or the like. In some examples, the calibration data 118 and the display identifier 117 are saved on the memory 120 of the display 102. In some examples, the calibration data 118 and the display identifier 117 are saved in the database 113 coupled to the calibrator 112. In some examples, the calibration data 118 and the display identifier 117 are saved on a memory 130 of a pen 132 including a camera 133 and usable with the display 102. In other examples, the calibration data 118 is accessible to the digital pen 132 from the display 102 and/or the host 103 to enable the digital pen 132 to be paired and/or used with the display 102.

Figure 2:
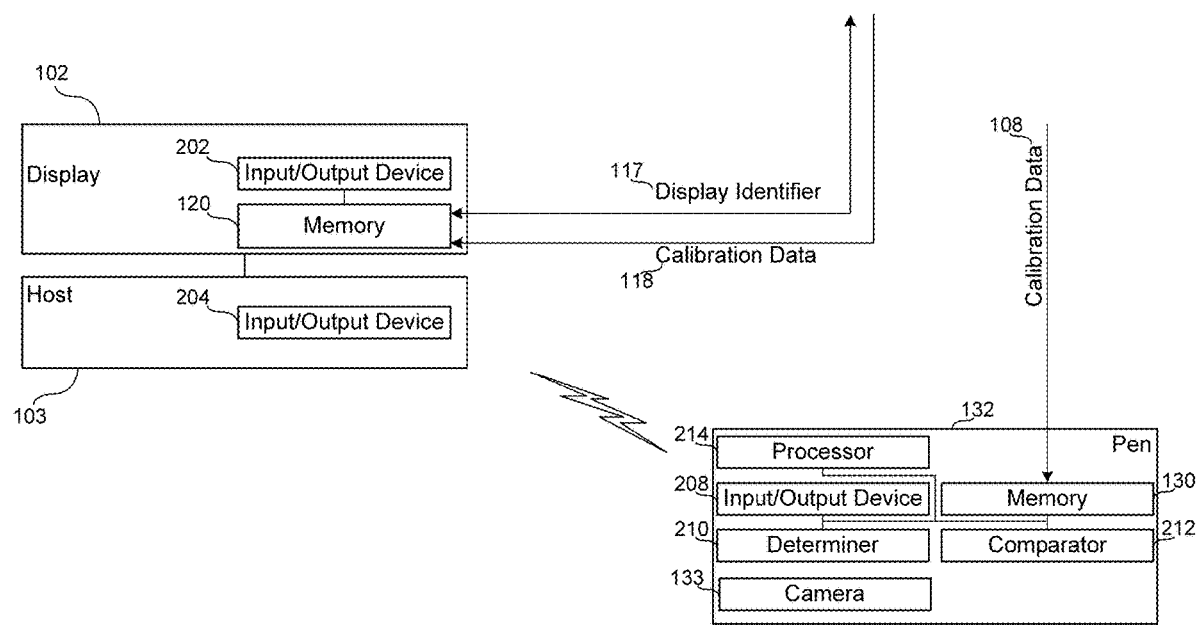
FIG. 2 is a schematic illustration of the example display, the example host and the example digital pen of FIG. 1.

FIG. 2 illustrates an example implementation of the example display 102, the example host 103 and the example digital pen 132 of FIG. 1. In the illustrated example, the display 102 includes the memory 120 and an example input/output device 202, the host 103 includes an example input/output device 204 and the digital pen 132 includes the example memory 130, an example input/output device 208, an example determiner 210, an example comparator 212 and an example processor 214. While the example of FIG. 2 illustrates the display 102 including the memory 120 and the host 103 including the input/output device 204, in other examples, the display 102 includes the input/output device 204 and the host 103 includes the memory 120; the display 102 includes the input/output device 204 and the memory 120; and/or the display 102 includes the input/output device 204 and the memory 120. In other words, the memory 120 and/or the input/output device 204 may be disposed in any location that is accessible to the display 102 and/or the host 103.

To enable the digital pen 132 to accurately decode the position-determining pattern 114 disposed overtop of the pixels 116 of FIG. 1, in the example of FIG. 2, the digital pen 132 uses the calibration data 118 that may be stored on the memory 120 of the display 102 and/or the memory 130 of the digital pen 132. To determine whether the calibration data 118 of the display 102 is stored on the memory 130 of the digital pen 132, in this example, the input/output device 208 of the digital pen 132 accesses the display identifier 117 from the memory 120 of the display 102 and the comparator 212 compares the display identifier 117 to other identifiers stored on the memory 130 of the digital pen 132. Based on the comparison, in this example, the determiner 210 determines whether the display identifier 117 is present in and/or the same as the identifiers stored on the memory 130 of the digital pen 132. The digital pen 132 may access the display identifier 117 in different ways. For example, in some examples, the input/output device 202 of the display 102 accesses the display identifier 117 from the memory 120 and provides the digital pen 132 access to display identifier 117. Additionally or alternatively, in some examples, the input/output device 206 of the host 103 is coupled to the memory 130 and provides the digital pen 132 access to the display identifier 117 stored on the memory 120 of the display 102.

In examples in which the determiner 210 determines that the display identifier 117 is the same as one of the identifiers stored on the memory 130 of the digital pen 132, the processor 214 of the digital pen 132 accesses the calibration data 118 associated with the display identifier 117 from the memory 130 to enable the digital pen 132 to be used with the display 102. In examples in which the determiner 210 determines the display identifier 117 is not the same as one of the identifiers stored the memory 130 of the digital pen 132, to enable the digital pen 132 to be used in connection with the display 102, the processor 214 causes the input/output device 208 to access the calibration data 118 and the associated display identifier 117 from the memory 120 of the display 102. Once accessed, the digital pen 132 may store the calibration data 118 and the associated display identifier 117 in the memory 130.

While an example manner of implementing the display 102, the host 103 and the digital pen 132 of FIG. 1 are illustrated in FIG. 2, the elements, processes and/or devices illustrated in FIG. 2 may be combined, divided, re-arranged, omitted, eliminated and/or implemented in any other way. Further, the example memory 120, the example input/output device 202, the example input/output device 204, the example memory 130, the example determiner 210, the example comparator 212, the example input/output device 208, the example processor 214 and/or more generally, the example display 102, the example host 103, the example calibrator 212 and/or the example digital pen 132 of FIG. 1 may be implemented by hardware, software, firmware and/or any combination of hardware, software and/or firmware. Thus, for example, any of the example memory 120, the example input/output device 202, the example input/output device 204, the example memory 130, the example determiner 210, the example comparator 212, the example input/output device 208, the example processor 214 and/or more generally, the example display 102, the example host 103, the example calibrator 212 and/or the example digital pen 132 of FIG. 1 could be implemented by an analog or digital circuit(s), a logic circuit(s), programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example memory 120, the example input/output device 202, the example input/output device 204, the example memory 130, the example determiner 210, the example comparator 212, the example input/output device 208, the example processor 214 and/or more generally, the example the example display 102, the example host 103, the example calibrator 212 and/or the example digital pen 132 of FIG. 1 is/are hereby expressly defined to include a tangible computer readable storage device or storage disk such as a memory, a digital versatile disk (DVD), a compact disk (CD), a Blu-ray disk, etc. storing the software and/or firmware. Further still, the example display 102, the example host 103, the example calibrator and/or the example digital pen 132 of FIG. 1 may include elements, processes and/or devices in addition to, or instead of, those illustrated in FIG. 2, and/or may include more than one of any or all of the illustrated elements, processes and devices.

Figure 3:
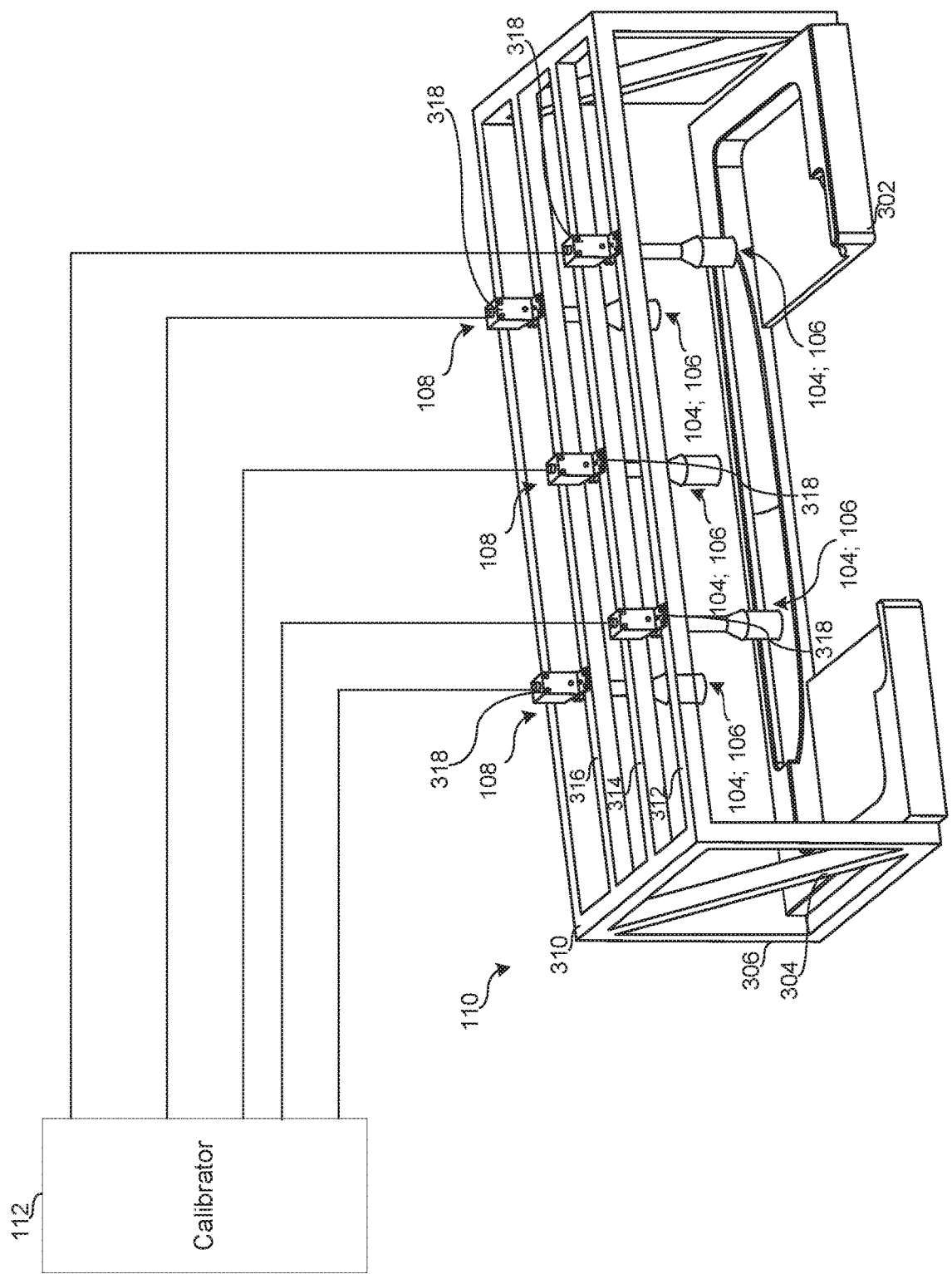
FIG. 3 illustrates example cameras, example lights and an example fixture that can be used to implement the example camera, the example light and the example fixture of FIG. 1.

FIG. 3 illustrates an example implementation of the example fixture 110, the example camera 104, the example light 106 and the example actuator/adjuster 108 of FIG. 1. In the illustrated example, the fixture 110 includes a base 302, a first side 304, a second side 306, a third side 308 and a top 310. In the example, the cameras 104, the lights 106, and/or the actuators/adjusters 108 are coupled to first, second and third beams 312, 314, 316 of the top 310 via respective brackets 318. In illustrated examples, the base 302 defines a recess and/or receptacle 322 that is sized to securely receive the display 102 and/or the host 103 while the example calibration process takes place. In some examples, the base 302 includes a first recess to receive a first sized display and a second recess to receive a second sized display. While the example of FIG. 3 illustrates five cameras 104, five lights 106 and five adjusters/actuators 108, any other number of cameras, lights and/or actuators/adjusters may be used. For example, the calibration system 100 may be implemented with zero actuators/adjusters 108, three cameras 104 and/or three lights 106. In this example, to enable the base 302 to be easily removed from the fixture 110 to be retooled and/or replaced, the base 302 is made of a different material and/or separate from first, second and third sides 304, 306, 308 and the top 310. However, in other examples, the base 302 is integrally made with the first, second and third sides 304, 306, 308 and the top 310 of the fixture 110.

Figure 4:
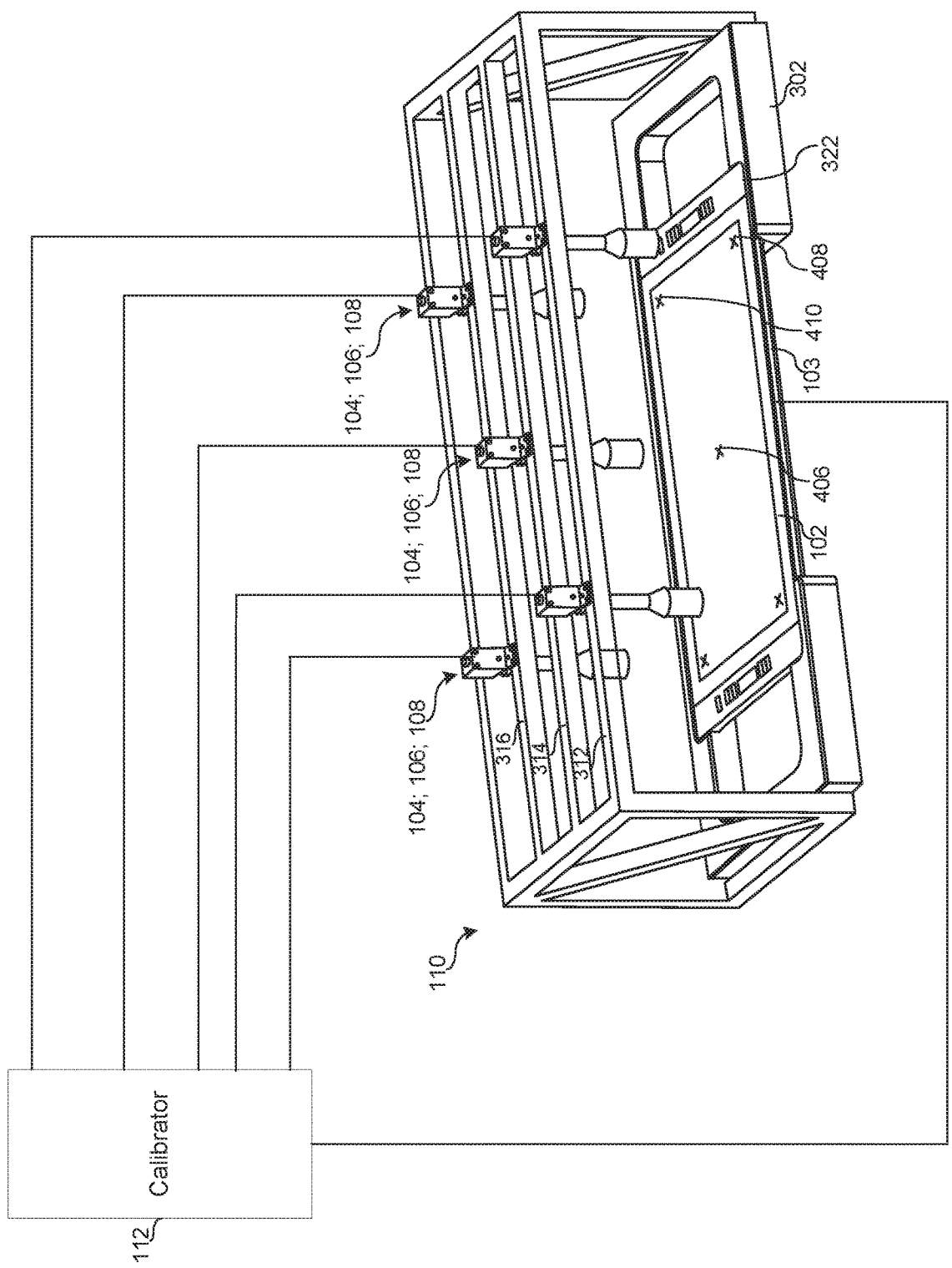
FIG. 4 illustrates an example display positioned within the example fixture of FIG. 2 and coupled to the example calibrator of FIG. 1.

FIG. 4 illustrates an example implementation of the example display 102 and the example host 103 being received within the recess 322 of the base 302 of the example fixture 110. In the example of FIG. 4, the display 102 is shown emitting a first target 402, a second target 404, a third target 406, a fourth target 408 and a fifth target 410 to enable the cameras 104 to obtain images used during the calibration process. In this example, the first, second, third fourth and fifth targets 402, 404, 406, 408, 410 are crosshair patterns that are disposed at known pixel locations on the display 102.

Figure 5:
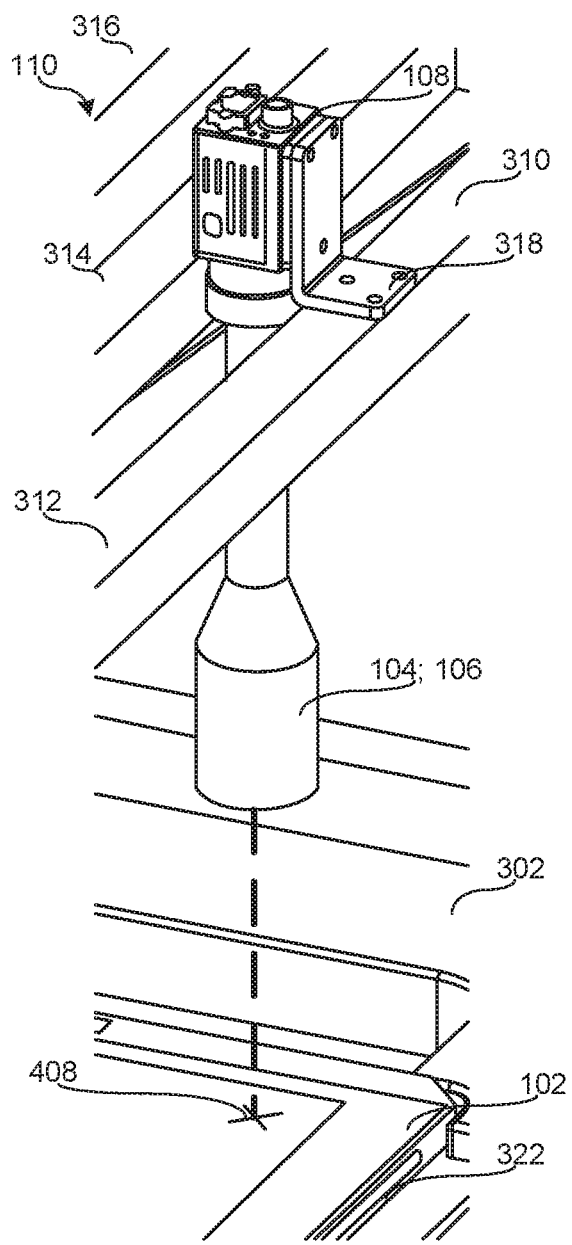
FIG. 5 illustrates a detailed view of the implementation of FIG. 4.

FIG. 5 illustrates a detailed view of the display 102 being received within the recess 322 of the base 302 and the camera 104 obtaining an image of the fourth target 408 on the display 102. In the example illustrated in FIG. 5, the bracket 318 is an L-shaped bracket that couples to a beam 502 of the top 310 of the fixture 110 and a side of the camera 104 and/or the light 106. In this example, the actuator/adjuster 108 is implemented by a spacer disposed between the bracket 318 and the side of the camera 104 and/or the light 106. In other examples, the actuator/adjuster 108 is implemented by slots and/or oblong apertures of the bracket 318 through which fasteners extend to couple the bracket 318 to the beam 502 and/or the side of the camera 104 and/or the light 106.

Figure 6:
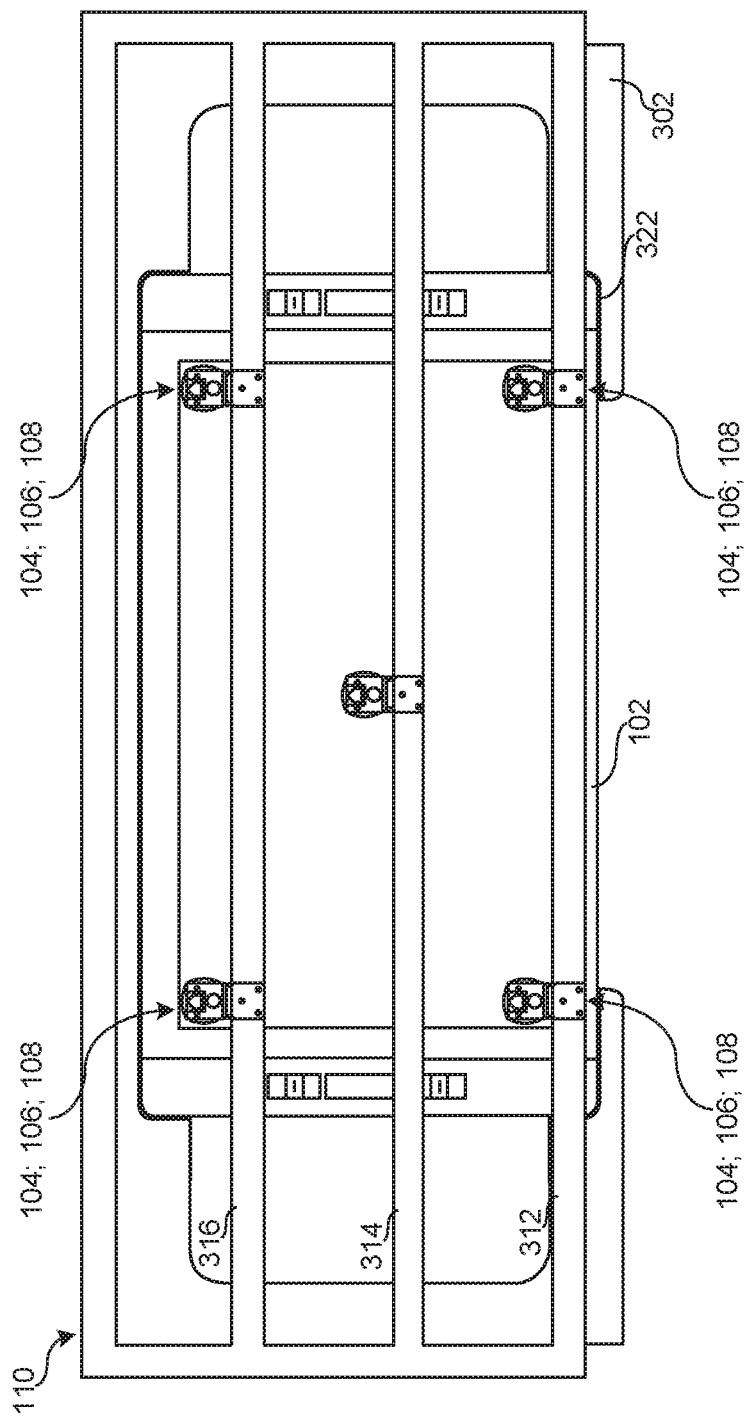
FIG. 6 illustrates a top-plan view of the implementation of FIG. 4.

FIG. 6 illustrates a top view of the display 102 being received within the recess 322 of the base 302. As shown in the example of FIG. 6, the fixture 110 includes the three beams 312, 314, 316 to which the brackets 318 and corresponding cameras 104 and/or the lights 106 are coupled. In other examples, the fixture 110 may include any other number of beams to facilitate the retention of the cameras 104 and/or the lights 106 relative to the display 102.

Figure 7:
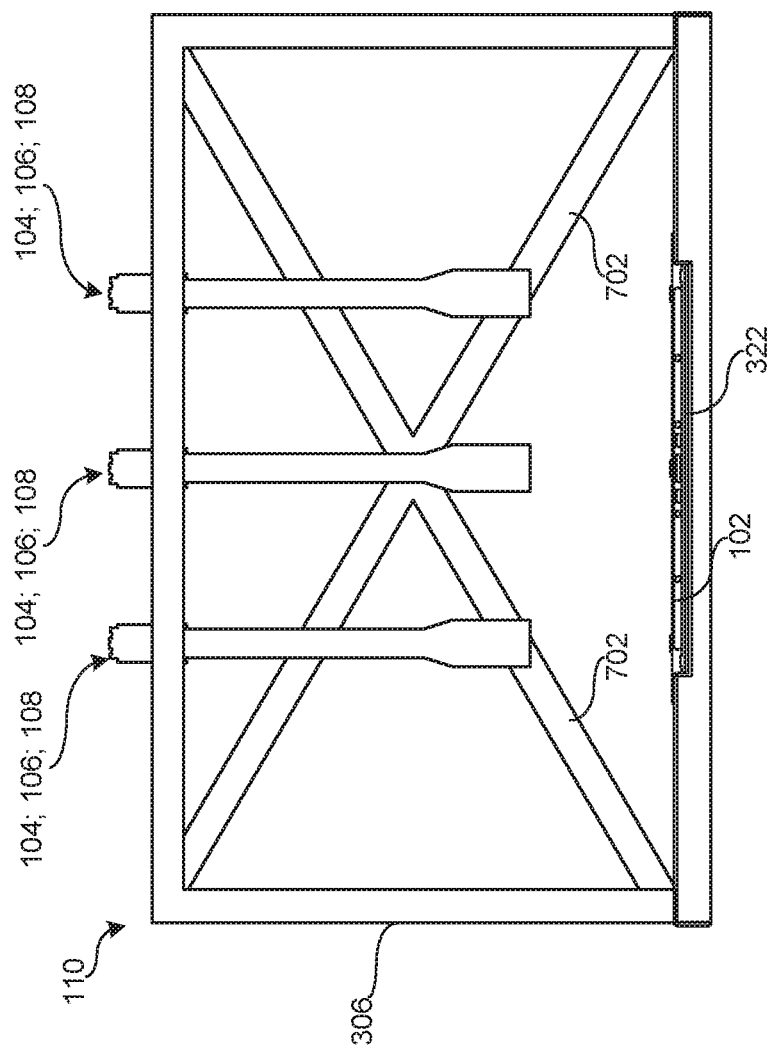
FIG. 7 illustrates a front view of the implementation of FIG. 4.

FIG. 7 illustrates a front view of the fixture 110 defining the recess 322 and receiving the display 102. In the example of FIG. 7, the second side 306 of the fixture 110 is shown as including a crossbeam 702 and the cameras 104 and/or the lights 106 are shown as facing a top of the display 102 to enable images of the position-determining pattern 114 and/or images of the first, second, third, fourth and/or fifth targets 402, 40 four, 406, 408, 410 to be obtained during the example calibration process.

Figure 8:
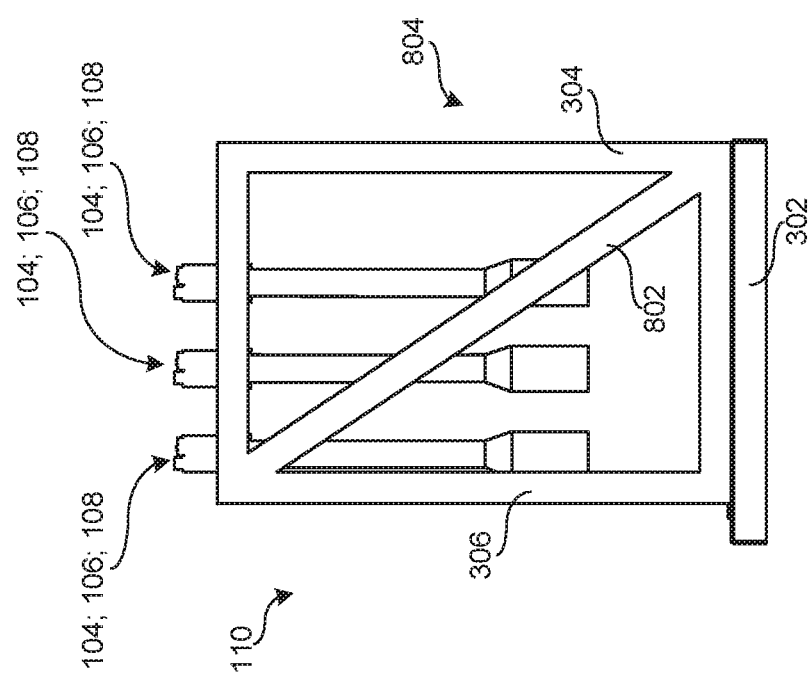
FIG. 8 illustrates a side view of the implementation of FIG. 4.

FIG. 8 illustrates a side view of the first side 304 of the fixture 110 including the cameras 104, the lights 106 and/or the actuator/adjusters 108. In the example of FIG. 8, the first side 304 includes a brace 802 that extends at an angle from the base 302 of the fixture 110 to the top 310 of the fixture 110. In this example, the cameras 104 and/or the lights 106 are illustrated as being substantially equally spaced relative to one another and closer to the second side 306 of the fixture 110 than to a front and/or access opening 804 of the fixture 110.

Figure 9:
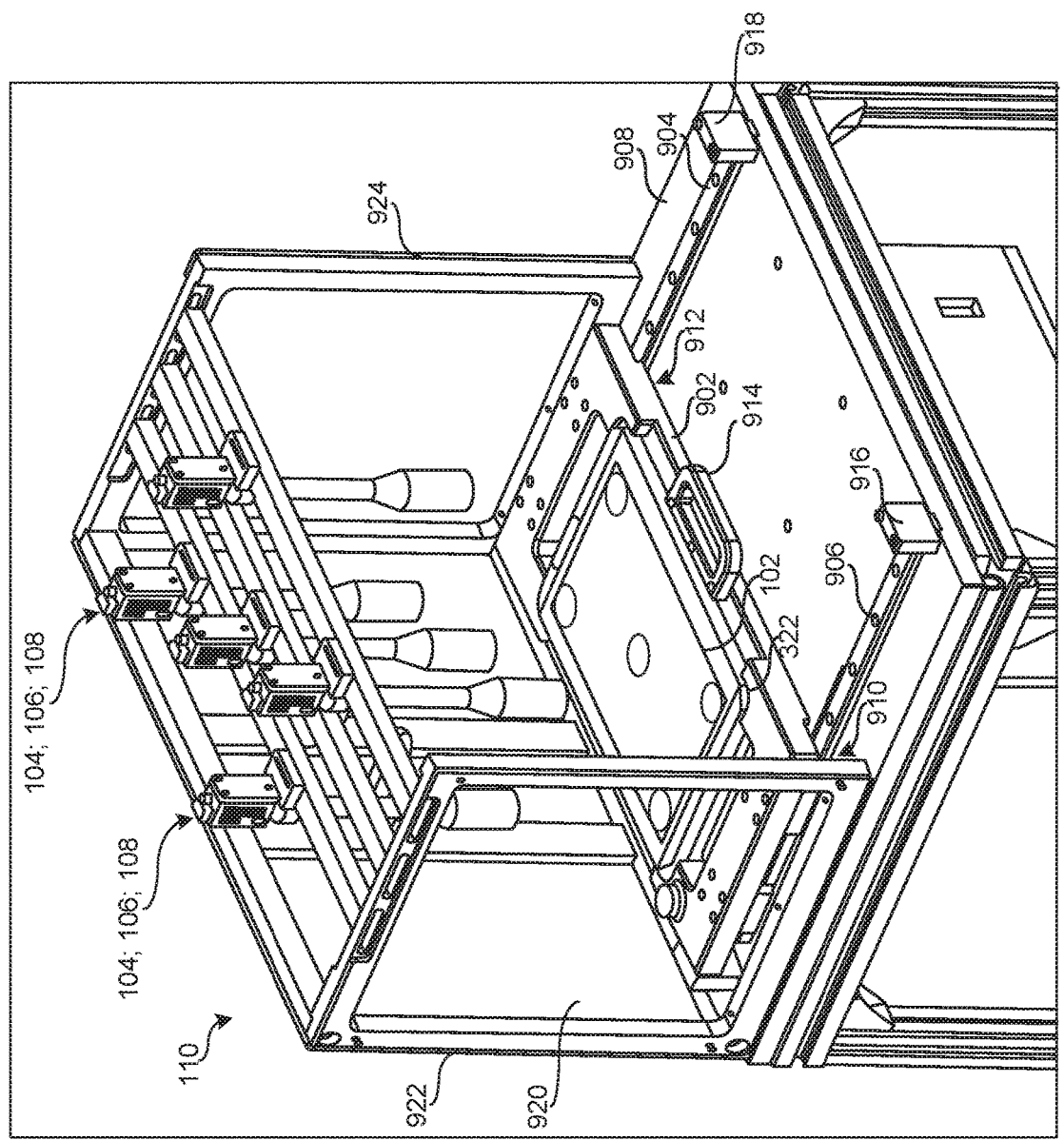
FIG. 9 illustrates example cameras, example lights and another example fixture that can be used to implement the example camera, the example light and the example fixture of FIG. 1.

FIG. 9 illustrates an alternative implementation of the fixture 110 to which the cameras 104, the lights 106 and/or the actuator/adjuster 108 are coupled. In contrast to the implementation shown in FIG. 3, the example fixture 110 of FIG. 9 includes an example base 902 that is movable relative to the cameras 104 and/or the lights 106 to enable the display 1022 be more easily positioned within the recess 322 prior to and/or after an example calibration process is performed. In the example of FIG. 9, rails 904, 906 are coupled to a stand 908 and receive corresponding guides and/or brackets (e.g., linear guides including bearings) 910, 912 to enable the base 902 to be moveable relative to the cameras 104 and/or the lights 106.

To enable the base 902 to be easily moved between a loading position in which the cameras 104 and/or the lights 106 are not positioned over top of the base 902 and a calibrating position in which the cameras 104 and/or the lights 106 are positioned over top of the base 902, a handle 914 is coupled to the base. In this example, to substantially ensure that the guides and/or brackets 910, 912 and, more generally, the base 902, is not pulled off of the rails 904, 906 when the base 902 is in the loading position, stops 916, 918 are coupled at the end of the rails 904, 906 to the stand 908. To deter debris and/or other factors (e.g., HFAC) from affecting the calibration process, the fixture 110 illustrated in FIG. 9 includes first, second and third sides 920, 922, 924 that are made of solid panels.

Figure 10:
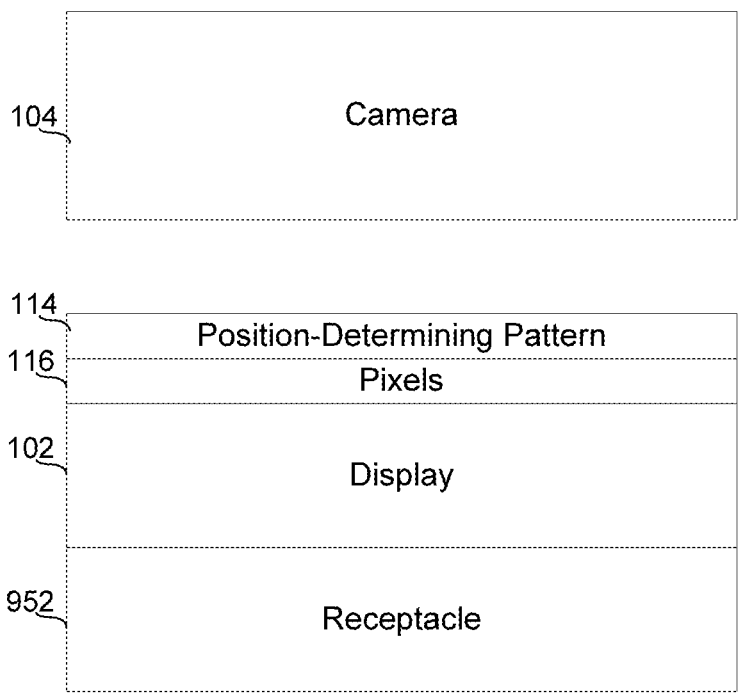
FIG. 10 is a schematic illustration of an example system used during an example calibration process to calibrate displays in accordance with the teachings of this disclosure.

FIG. 10 illustrates an example calibration system 950 that can be used to calibrate displays in a cost-effective and efficient manner. In the illustrated example, the calibration system 950 performs tests on the display 102 and uses the results of the tests to determine calibration data for the display 102. In this example, when such tests are being performed, the display 102 is received by a receptacle 952. As shown in the illustrated example, the display 102 includes the example position-determining pattern 114 and the example pixels 116. In the illustrated example, the calibration system 950 includes the example camera 104 disposed overtop of the display 102 to enable the camera 104 to obtain an image of the display 102. In some examples, the images is processed to determine calibration data that accounts for misalignment between the position-determining pattern 114 and the pixels 116.

Flowcharts representative of example machine readable instructions for implementing the calibrator 112, the display 102, the host 103 and the digital pen 132 of FIG. 1 are shown in FIGS. 11, 12, 13 and 14. In this example, the machine readable instructions comprise a program for execution by a processor such as the processor 1312 shown in the example processor platforms 1300, 1400 and/or 1500 discussed below in connection with FIGS. 14, 15, 16. The program may be embodied in software stored on a tangible computer readable storage medium such as a CD-ROM, a floppy disk, a hard drive, a digital versatile disk (DVD), a Blu-ray disk, or a memory associated with the processor 1312, 1412, 1512, but the entire program and/or parts thereof could alternatively be executed by a device other than the processor 1312 and/or embodied in firmware or dedicated hardware. Further, although the example program is described with reference to the flowcharts illustrated in FIGS. 11, 12, 13 and 14, many other methods of implementing the calibrator 112, the display 102, the host 103 and the digital pen 132 of FIG. 1 may alternatively be used. For example, the order of execution of the blocks may be changed, and/or some of the blocks described may be changed, eliminated, or combined.

As mentioned above, the example processes of FIGS. 11, 12, 13 and 14 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 11, 12, 13 and 14 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 11:
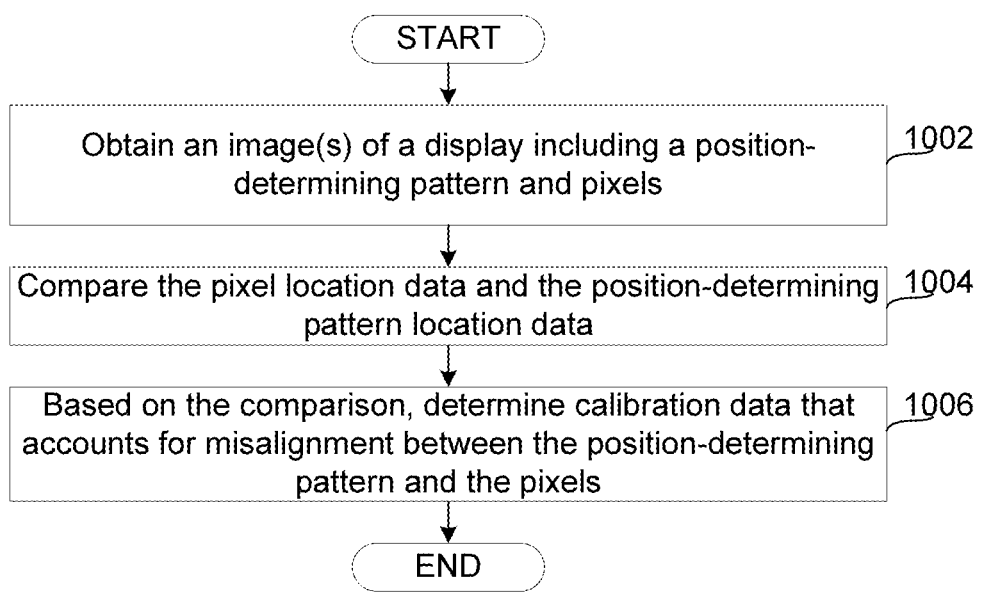
FIG. 11 is a flowchart representative of machine readable instructions that may be executed to implement the calibrator of FIG. 1.

The program of FIG. 11 begins with the calibrator 112 obtaining an image of the display 102 including the position-determining data 114 and the pixels 116 (block 1002). As shown in the example of FIG. 1, the display 102 includes the position-determining pattern 114 disposed overtop of the pixels 116 of the display 102. The calibrator 112 compares the pixel location data 126 and the position-determining pattern location data 122 (block 1004). The calibrator 112 determines the calibration data 118 based on comparison between the pixel location data 126 and the position-determining pattern location data 122 (block 1006).

Figure 12:
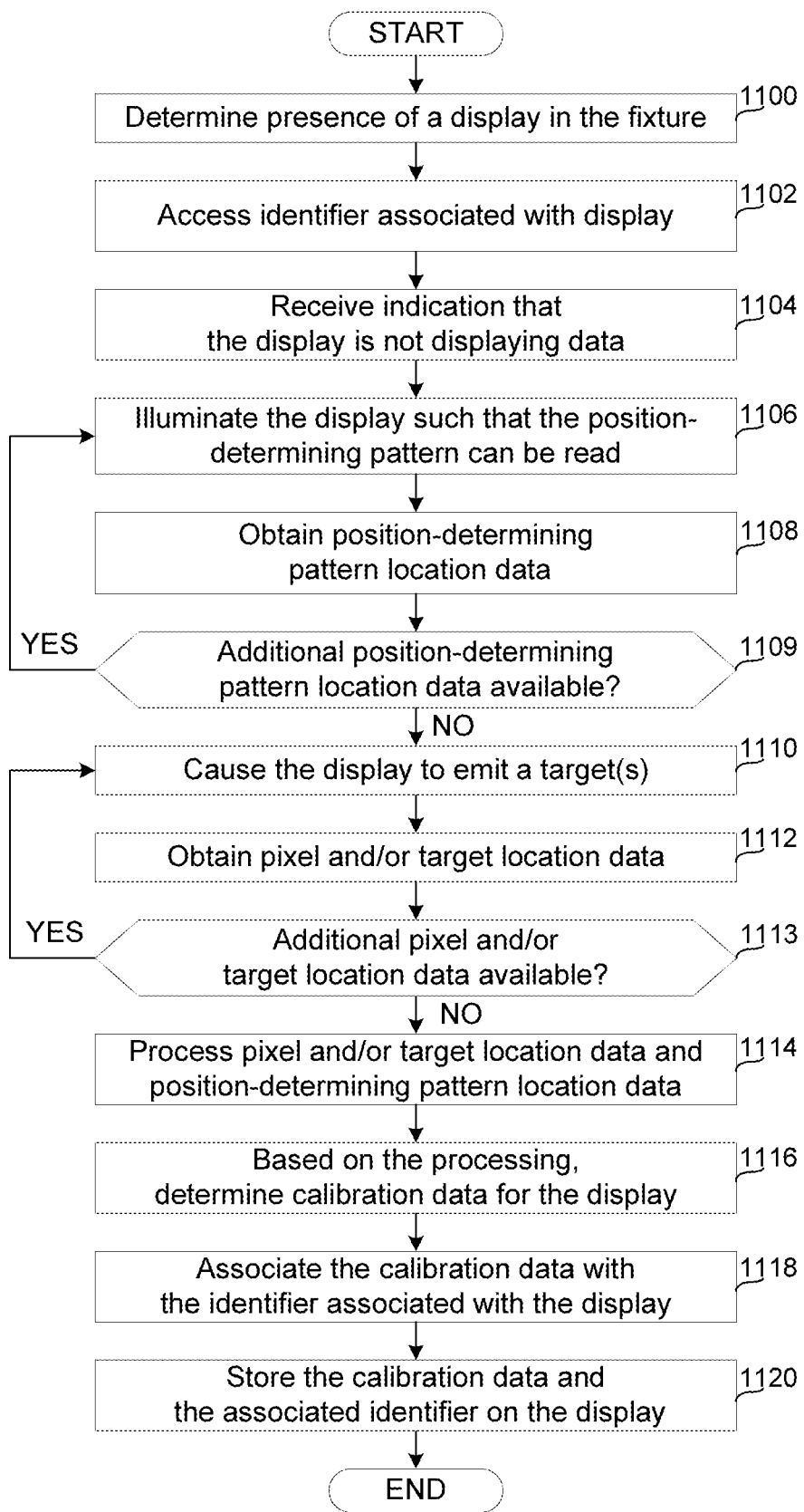
FIG. 12 is a flowchart representative of machine readable instructions that may be executed to implement the calibrator of FIG. 1.

The program of FIG. 12 begins with the calibrator 112 determining the presence of the display 102 within the recess 322 of the fixture 110 (block 1100). The calibrator 112 accesses the display identifier 117 from the memory 120 of the display 102 to enable the calibrator 112 to be able to associate the calibration data 118 and/or the calibration process performed with the display 102 (block 1102).

The calibrator 112 receives an indication that the display 102 is not displaying data to enable the position-determining pattern 114 to be detectable by determining a status of the display 102 (block 1104). The calibrator 112 causes the light 106 to illuminate the display 102 to enable the position-determining pattern 114 to be read and/or detectable (block 1106). In some examples, the light 106 emits synchronized strobe lights and/or infrared light that enable the position-determining pattern 114 to be detectable. However, the light 106 may illuminate the display 102 in any other suitable way. The calibrator 112 obtains the position-determining pattern location data 122 after causing the camera 104 to obtain an image of the position-determining pattern 114 while the light 106 illuminates the display (block 1108). The calibrator 112 then determines whether additional position-determining location data 122 is available (block 1109). In some examples, the calibrator 112 accesses position-determining location data 122 at different locations on the display such as, for example, the five locations adjacent where the respective cameras 104 capture images.

The calibrator 112 generates a target display input 124 that causes the pixels 116 to emit a static target(s) at known pixel locations on the display 102 to enable a location of the pixels 116 to be determined (block 1110). The calibrator 112 obtains the pixel and/or target location data 126 after causing the camera 104 to obtain an image of the targets while the targets are shown on the display 102 (block 1112). The calibrator 112 then determines whether additional pixel and/or target location data 126 is available (block 1113). In some examples, the calibrator 112 accesses pixel and/or target location data 126 at different locations on the display 102 such as, for example, the locations adjacent where the respective cameras 104 capture images and the display 102 emits the targets 402, 404, 406, 408, 410.

The calibrator 112 processes the position-determining pattern location data 122 and the pixel and/or target location data 126 to identify any mechanical misalignments and/or offsets between the position-determining pattern 114 and the pixels 116 (block 1114). Based on the processing and to compensate for any mechanical misalignments and/or offsets identified between the position-determining pattern 114 and the pixels 116, the calibrator 112 determines the calibration data 118 for the display 102 (block 1116). The calibrator 112 associates the calibration data 118 with the display identifier 117 (block 1118) and causes the calibration data and the associated display identifier 117 to be stored on the memory 120 of the display 102 (block 1120).

Figure 13:
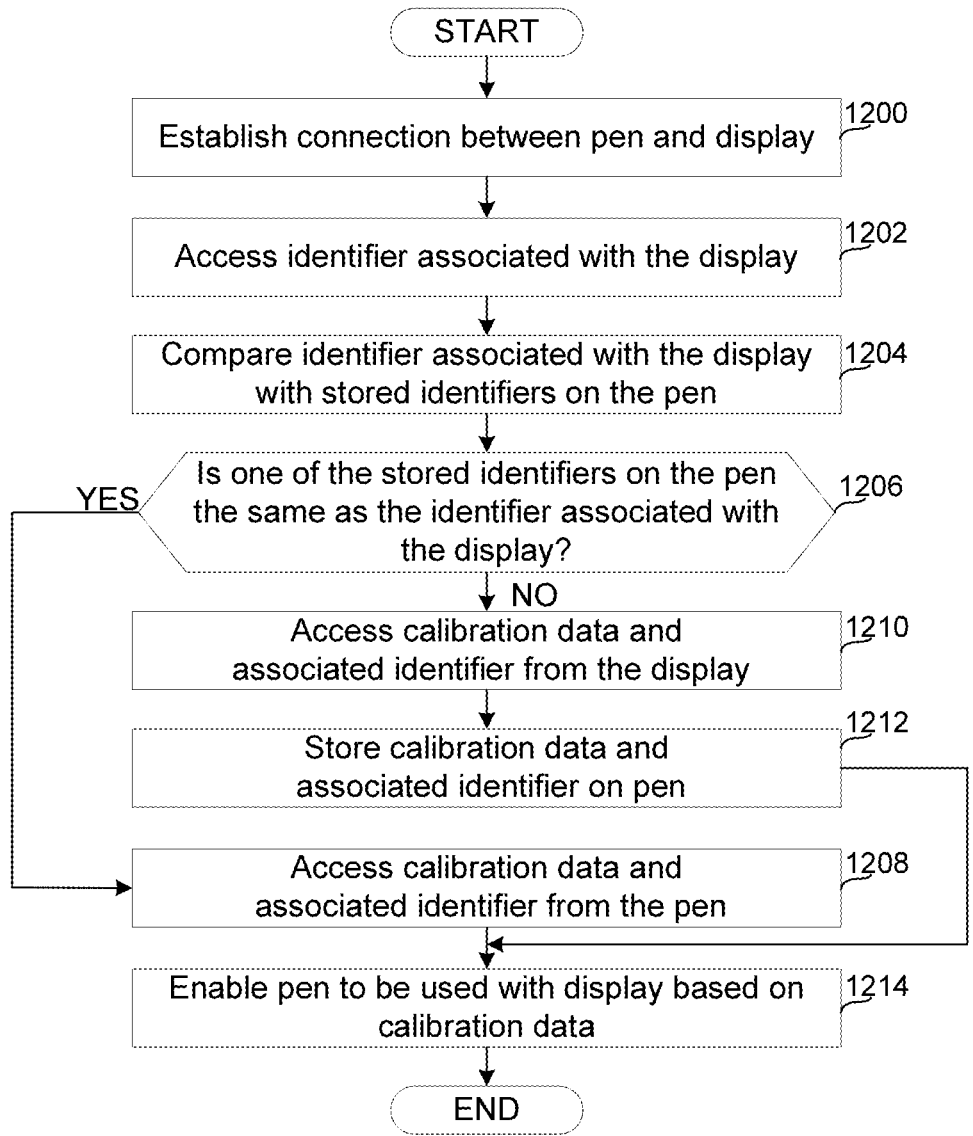
FIG. 13 is a flowchart representative of machine readable instructions that may be executed to implement the digital pen of FIGS. 1 and 2.

The program of FIG. 13 begins by the digital pen 132 establishing a connection with the display 102 to enable the digital pen 132 to accurately decode the position-determining pattern 114 disposed overtop of the pixels 116 (block 1200). The connection between the digital pen 132 and the display 102 may be a wireless connection and/or a wired connection. The input/output device 208 of the digital pen 132 accesses the display identifier 117 from the memory 120 of the display 102 to determine whether the calibration data 118 of the display 102 is stored on the memory 130 of the digital pen 132 (block 1202). The comparator 212 compares the obtained display identifier 117 to other identifiers stored on the memory 130 of the digital pen 132 (block 1204).

Based on the comparison, the determiner 210 determines whether the display identifier 117 is the same as the identifiers previously stored on the memory 130 of the digital pen 132 (block 1206). If the determiner 210 determines that the display identifier 117 is present in the identifiers previously stored on the memory 130 of the digital pen 132, the processor 214 of the digital pen 132 accesses the calibration data 118 associated with the display identifier 117 from the memory 130 of the digital pen 132 to enable the digital pen 132 to be used with the display 102 (block 1208).

However, if the determiner 210 determines that the display identifier 117 is not the same as the identifiers previously stored on the memory 130 of the digital pen 132, the processor 214 of the pen 132 causes the input/output device 208 to access the calibration data 118 and the associated display identifier 117 from the memory 120 of the display 102 to enable the digital pen 132 to be used in connection with the display 102 (block 1210). Once accessed, the digital pen 132 stores the calibration data 118 and the associated display identifier 117 in the memory 130 of the digital pen 132 (block 1212). The digital pen 132 is usable with the display 102 based on the calibration data 118 (block 1214).

Figure 14:
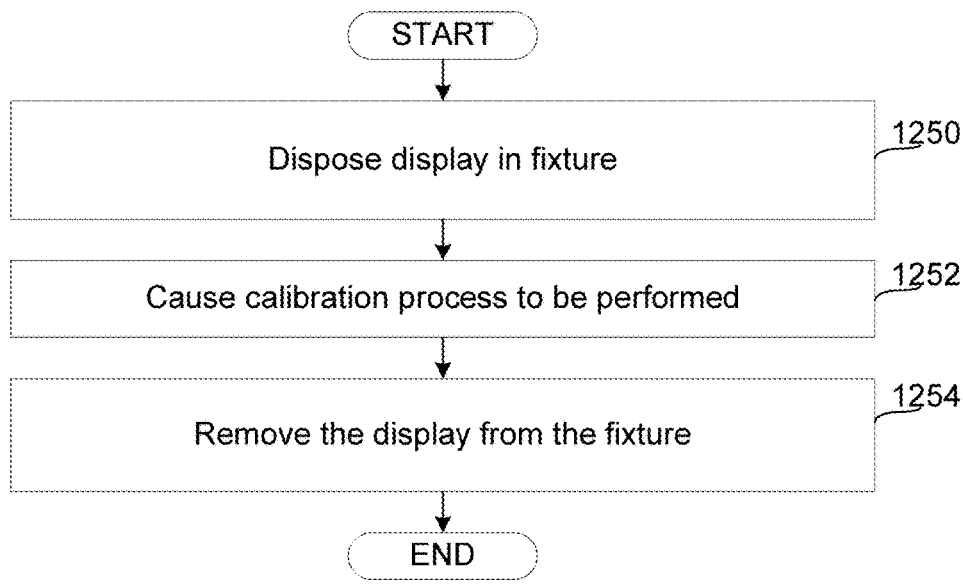
FIG. 14 is a flowchart representative of machine readable instructions that may be executed to implement the systems of FIGS. 1 and/or 10.

The program of FIG. 14 begins with the display 102 being disposed in the fixture 110 (block 1250). In some examples, the display 102 is disposed in the fixture 110 using an arm (e.g., a robotic arm), a positioner and/or another conveyor (e.g., a conveyor belt). As shown in the examples of FIGS. 1 and 10, the display 102 includes the position-determining pattern 114 disposed overtop of the pixels 116 of the display 102.

The calibration process is caused to be performed to generate the calibration data 118 that accounts for misalignment between the position-determining pattern 114 and the pixels 116 (block 1252). In some examples, the calibration process includes the calibrator 112 processing an image including the position-determining pattern location data 122 and the pixel and/or target location data 126 to identify any mechanical misalignments and/or offsets between the position-determining pattern 114 and the pixels 116. The display 102 is removed from the fixture 110 (block 1254). In some examples, the display 102 is remove from the fixture 110 using an arm (e.g., a robotic arm), a positioner and/or another conveyor (e.g., a conveyor belt).

Figure 15:
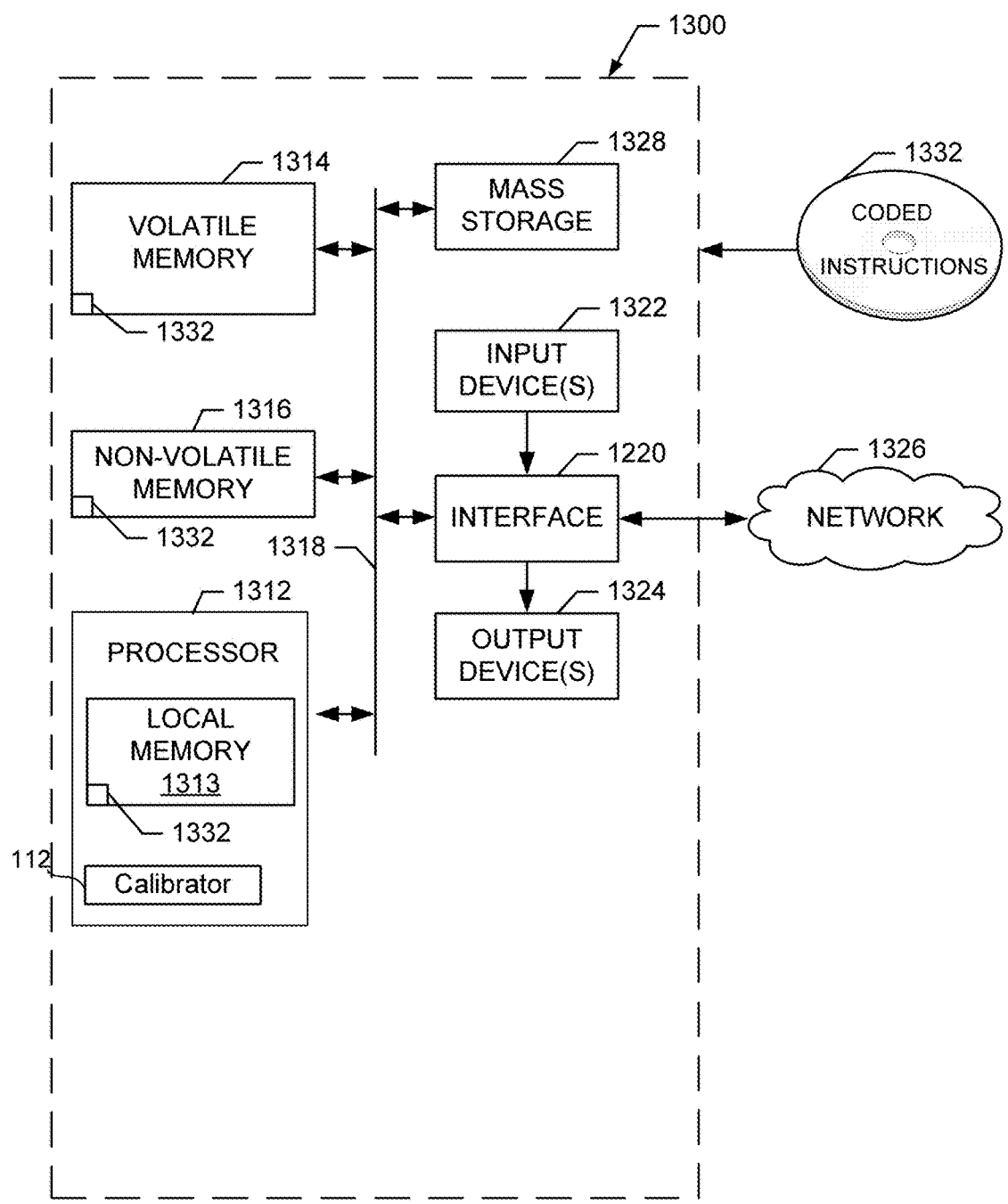
FIG. 15 is a processor platform to execute the instructions of FIGS. 11, 12, 13 and 14 to implement the calibrator of FIG. 1.

FIG. 15 is a block diagram of an example processor platform 1300 capable of executing the instructions of FIGS. 11, 12, 13 and/or 14 to implement the calibrator 112 of FIG. 1. The processor platform 1300 can be, for example, a server, a personal computer, a mobile device (e.g., a cell phone, a smart phone, a tablet such as an iPad™), a personal digital assistant (PDA), an Internet appliance or any other type of computing device.

The processor platform 1300 of the illustrated example includes a processor 1312. The processor 1312 of the illustrated example is hardware. For example, the processor 1312 can be implemented by an integrated circuit(s), a logic circuit(s), a microprocessor(s) or controller(s) from any desired family or manufacturer. In this example, the processor 1312 implements the example calibrator 112.

The processor 1312 of the illustrated example includes a local memory 1313 (e.g., a cache). The processor 1312 of the illustrated example is in communication with a main memory including a volatile memory 1314 and a non-volatile memory 1316 via a bus 1318. The volatile memory 1314 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320. The interface circuit 1320 may be implemented by any type of interface standard, such as an Ethernet interface, a universal serial bus (USB), and/or a PCI express interface.

In the illustrated example, input devices 1322 are connected to the interface circuit 1320. The input device(s) 1322 permit(s) a user to enter data and commands into the processor 1012. The input device(s) can be implemented by, for example, an audio sensor, a microphone, a camera (still or video), a keyboard, a button, a mouse, a touchscreen, a track-pad, a trackball and/or an isopoint.

One or more output devices 1324 are also connected to the interface circuit 1320 of the illustrated example. The output devices 1324 can be implemented, for example, by display devices (e.g., a light emitting diode (LED), an organic light emitting diode (OLED), a liquid crystal display, a cathode ray tube display (CRT), a touchscreen, a tactile output device. The interface circuit 1320 of the illustrated example, thus, typically includes a graphics driver card, a graphics driver chip or a graphics driver processor.

The interface circuit 1320 of the illustrated example also includes a communication device such as a transmitter, a receiver, a transceiver, a modem and/or network interface card to facilitate exchange of data with external machines (e.g., computing devices of any kind) via a network 1326 (e.g., an Ethernet connection, a digital subscriber line (DSL), a telephone line, coaxial cable, a cellular telephone system, etc.).

The processor platform 1300 of the illustrated example also includes a mass storage device(s) 1328 for storing software and/or data. Examples of such mass storage devices 1328 include floppy disk drives, hard drive disks, compact disk drives, Blu-ray disk drives, RAID systems, and digital versatile disk (DVD) drives.

The coded instructions 1332 of FIGS. 11-14 may be stored in the mass storage device 1328, in the volatile memory 1314, in the non-volatile memory 1316, and/or on a removable tangible computer readable storage medium such as a CD or DVD.

Figure 16:
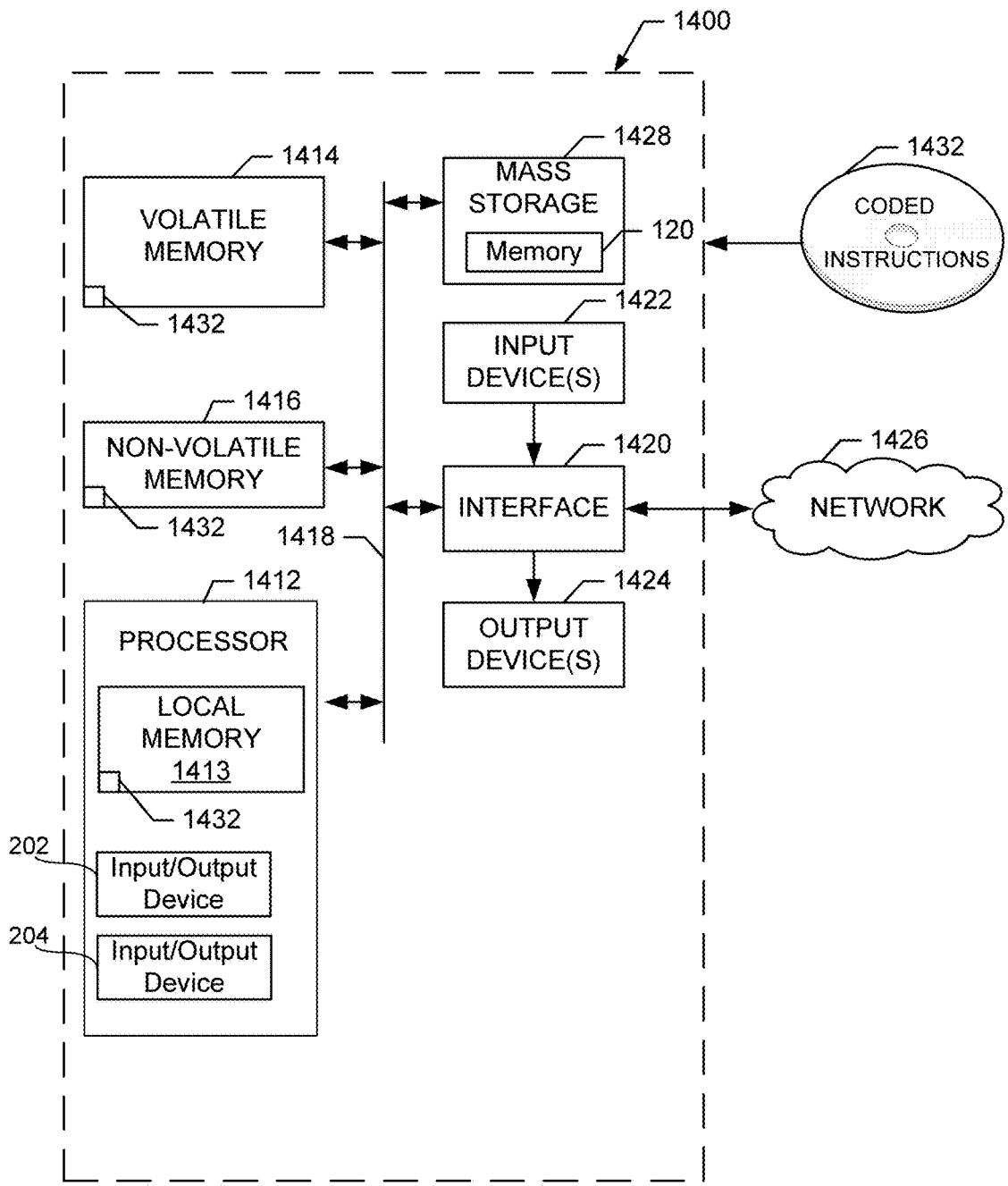
FIG. 16 is a processor platform to execute the instructions of FIGS. 11, 12, 13 and 14 to implement the display and the host of FIGS. 1 and 2.

FIG. 16 is a block diagram of an example processor platform 1300 capable of executing the instructions of FIGS. 11, 12, 13 and/or 14 to implement the display 102 and/or the host 103 of FIGS. 1 and/or 2. The processor platform 1400 can be, for example, a server, a personal computer, a mobile device (e.g., a cell phone, a smart phone, a tablet such as an iPad™), a personal digital assistant (PDA), an Internet appliance or any other type of computing device.

The processor platform 1400 of the illustrated example includes a processor 1412. The processor 1412 of the illustrated example is hardware. For example, the processor 1412 can be implemented by an integrated circuit(s), a logic circuit(s), a microprocessor(s) or controller(s) from any desired family or manufacturer. In this example, the processor 1412 implements the example display 102 and the example host 103.

The processor 1412 of the illustrated example includes a local memory 1413 (e.g., a cache). The processor 1412 of the illustrated example is in communication with a main memory including a volatile memory 1414 and a non-volatile memory 1416 via a bus 1418. The volatile memory 1414 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1416 may be implemented by flash memory and/or any other desired type of memory device. Access to the main memory 1414, 1416 is controlled by a memory controller.

The processor platform 1400 of the illustrated example also includes an interface circuit 1420. The interface circuit 1420 may be implemented by any type of interface standard, such as an Ethernet interface, a universal serial bus (USB), and/or a PCI express interface.

In the illustrated example, input devices 1422 are connected to the interface circuit 1420. The input device(s) 1422 permit(s) a user to enter data and commands into the processor 1012. The input device(s) can be implemented by, for example, an audio sensor, a microphone, a camera (still or video), a keyboard, a button, a mouse, a touchscreen, a track-pad, a trackball and/or an isopoint.

One or more output devices 1424 are also connected to the interface circuit 1420 of the illustrated example. The output devices 1424 can be implemented, for example, by display devices (e.g., a light emitting diode (LED), an organic light emitting diode (OLED), a liquid crystal display, a cathode ray tube display (CRT), a touchscreen, a tactile output device. The interface circuit 1420 of the illustrated example, thus, typically includes a graphics driver card, a graphics driver chip or a graphics driver processor.

The interface circuit 1420 of the illustrated example also includes a communication device such as a transmitter, a receiver, a transceiver, a modem and/or network interface card to facilitate exchange of data with external machines (e.g., computing devices of any kind) via a network 1426 (e.g., an Ethernet connection, a digital subscriber line (DSL), a telephone line, coaxial cable, a cellular telephone system, etc.).

The processor platform 1400 of the illustrated example also includes a mass storage device(s) 1428 for storing software and/or data. Examples of such mass storage devices 1428 include floppy disk drives, hard drive disks, compact disk drives, Blu-ray disk drives, RAID systems, and digital versatile disk (DVD) drives. In this example, the mass storage device 1428 includes the memory 120.

The coded instructions 1432 of FIGS. 11-14 may be stored in the mass storage device 1428, in the volatile memory 1414, in the non-volatile memory 1416, and/or on a removable tangible computer readable storage medium such as a CD or DVD.

Figure 17:
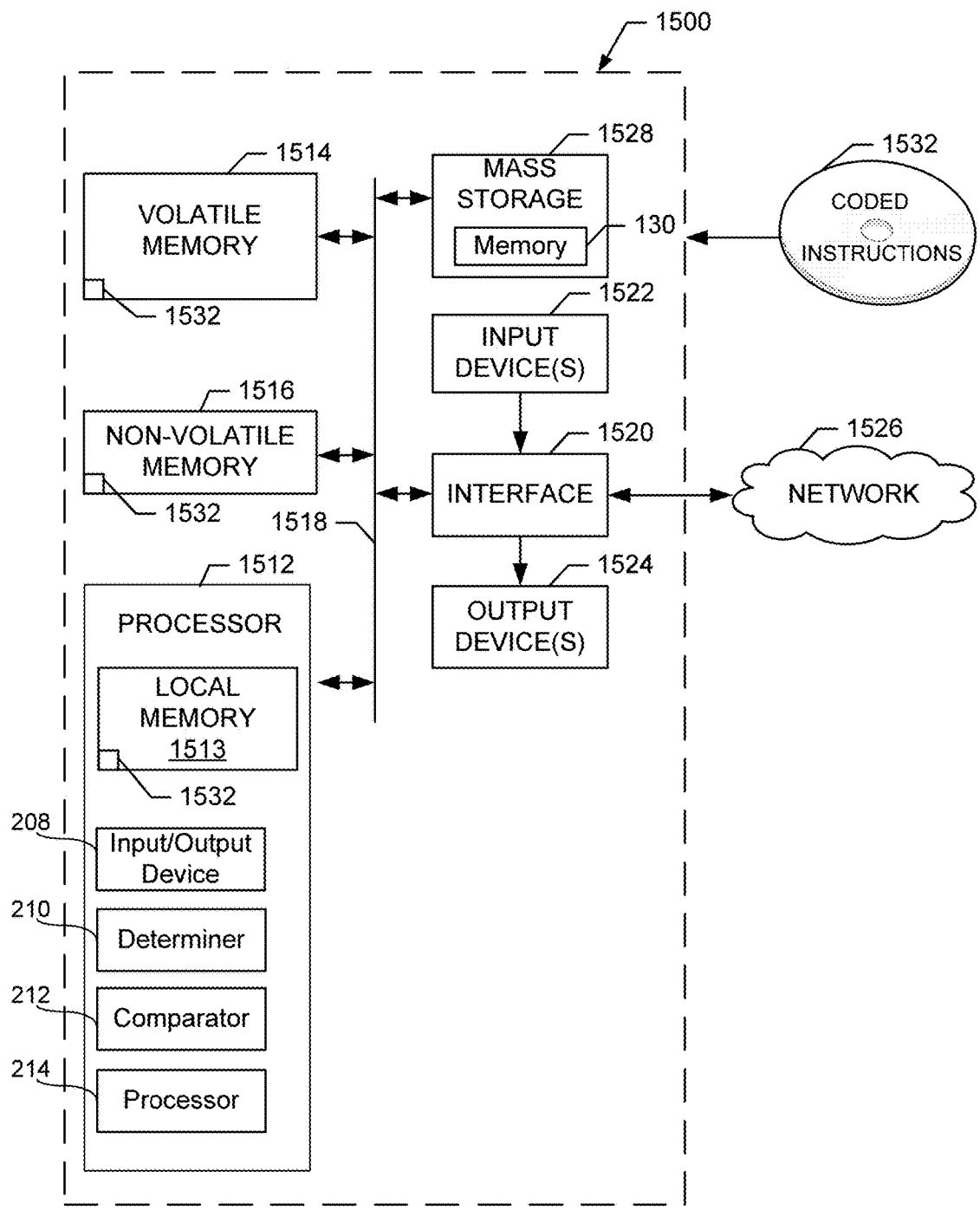
FIG. 17 is a processor platform to execute the instructions of FIGS. 11, 12, 13 and 14 to implement the digital pen of FIGS. 1 and 2.

FIG. 17 is a block diagram of an example processor platform 1300 capable of executing the instructions of FIGS. 11, 12, 13 and/or 14 to implement the digital pen 132 of FIGS. 1 and/or 2. The processor platform 1400 can be, for example, a server, a personal computer, a mobile device (e.g., a cell phone, a smart phone, a tablet such as an iPad™), a personal digital assistant (PDA), an Internet appliance or any other type of computing device.

The processor platform 1500 of the illustrated example includes a processor 1512. The processor 1512 of the illustrated example is hardware. For example, the processor 1512 can be implemented by an integrated circuit(s), a logic circuit(s), a microprocessor(s) or controllers from any desired family or manufacturer. In this example, the processor 1512 implements the example input/output device 208, the example determiner 210, the example comparator 212 and the example processor 214.

The processor 1512 of the illustrated example includes a local memory 1513 (e.g., a cache). The processor 1512 of the illustrated example is in communication with a main memory including a volatile memory 1514 and a non-volatile memory 1516 via a bus 1518. The volatile memory 1514 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1516 may be implemented by flash memory and/or any other desired type of memory device. Access to the main memory 1514, 1516 is controlled by a memory controller.

The processor platform 1500 of the illustrated example also includes an interface circuit 1520. The interface circuit 1520 may be implemented by any type of interface standard, such as an Ethernet interface, a universal serial bus (USB), and/or a PCI express interface.

In the illustrated example, an input device(s) 1522 are connected to the interface circuit 1520. The input device(s) 1522 permit(s) a user to enter data and commands into the processor 1012. The input device(s) can be implemented by, for example, an audio sensor, a microphone, a camera (still or video), a keyboard, a button, a mouse, a touchscreen, a track-pad, a trackball and/or an isopoint.

One or more output devices 1524 are also connected to the interface circuit 1520 of the illustrated example. The output devices 1524 can be implemented, for example, by display devices (e.g., a light emitting diode (LED), an organic light emitting diode (OLED), a liquid crystal display, a cathode ray tube display (CRT), a touchscreen, a tactile output device. The interface circuit 1520 of the illustrated example, thus, typically includes a graphics driver card, a graphics driver chip or a graphics driver processor.

The interface circuit 1520 of the illustrated example also includes a communication device such as a transmitter, a receiver, a transceiver, a modem and/or network interface card to facilitate exchange of data with external machines (e.g., computing devices of any kind) via a network 1526 (e.g., an Ethernet connection, a digital subscriber line (DSL), a telephone line, coaxial cable, a cellular telephone system, etc.).

The processor platform 1500 of the illustrated example also includes a mass storage device(s) 1528 for storing software and/or data. Examples of such mass storage devices 1528 include floppy disk drives, hard drive disks, compact disk drives, Blu-ray disk drives, RAID systems, and digital versatile disk (DVD) drives. In this example, the mass storage device 1528 includes the memory 130.

The coded instructions 1532 of FIGS. 11-14 may be stored in the mass storage device 1528, in the volatile memory 1514, in the non-volatile memory 1516, and/or on a removable tangible computer readable storage medium such as a CD or DVD.

From the foregoing, it will be appreciated that the above disclosed methods, apparatus and articles of manufacture relate to calibrating displays such as tablets using images and/or data obtained from a camera other than a camera on the digital pen. Thus, the examples disclosed herein enable the displays to be calibrated prior to the display being paired and/or associated with a digital pen and/or in a factory and/or production setting.

An example method includes obtaining an image of a display including a position-determining pattern and pixels, the image including pixel location data and position-determining pattern location data; comparing the pixel location data and the position-determining pattern location data; and based on the comparison, determining calibration data that accounts for misalignment between the position-determining pattern and the pixels.

In some examples, the method includes causing the display to be illuminated to enable the position-determining pattern to be detectable in the image. In some examples, the calibration data is determined for the display prior to a digital pen being connected with the display. In some examples, the image includes a first image of the position-determining pattern and a second image of a target being emitted by the display. In some examples, the comparing of the pixel location data and the position-determining pattern location data includes comparing the first image and the second image. In some examples, the pixel location data includes a target being emitted at a known pixel location on the display. In some examples, the method includes storing the calibration data on a memory of the display.

In some examples, the storing of the calibration data on the memory of the display includes storing the calibration data on the memory in association with an identifier of the display. In some examples, the image is obtained with a first camera different than a second camera of a digital pen, the digital pen to be used with the display.

An examples apparatus includes a receptacle to receive a display including a position-determining pattern and pixels; and a camera to be disposed overtop of the display to obtain an image of the display, the image to be processed to determine calibration data that accounts for misalignment between the position-determining pattern and the pixels.

In some examples, the apparatus includes a fixture including the receptacle, the camera being coupled to the fixture. In some examples, the receptacle is movably coupled relative to the camera to enable the display to be positioned within the receptacle. In some examples, the camera is to be disposed overtop of the display at known locations of the pixels of the display. In some examples, the apparatus includes a light to illuminate the display to enable the position-determining pattern to be detectable when the image is obtained. In some examples, the image is a first image associated with the position-determining pattern and a second image associated with the pixels.

An example method includes disposing a display in a fixture, the display including a position-determining pattern and pixels; causing a calibration process to be performed to generate calibration data that accounts for misalignment between the position-determining pattern and the pixels; and removing the display from the fixture.

In some examples, causing the calibration process to be performed includes obtaining an image of the display using a camera coupled to the fixture. In some examples, the method includes causing the display to be illuminated to enable the position-determining pattern to be detectable in the image. In some examples, the calibration process is performed without use of a digital pen to be used with the display. In some examples, the fixture includes a receptacle to receive the display during the calibration process.

An example method includes obtaining an image of a display using a first camera different than a second camera of a digital pen, the digital pen to be used with the display, the display including a position-determining pattern disposed overtop of pixels of the display; processing the image to determine calibration data that accounts for misalignment between the position-determining pattern and the pixels; and storing the calibration data on a memory of the display.

In some examples, the calibration data is determined for the display prior to the digital pen being connected with the display. In some examples, the image includes a first image of the position-determining pattern and a second image of targets being emitted by the display. In some examples, the targets are emitted at known pixel locations on the display. In some examples, the method includes causing the display to be illuminated to enable the position-determining pattern to be detectable when the first image is obtained. In some examples, the method includes causing the targets to be emitted by the display. In some examples, the storing of the calibration data on the memory of the display includes storing the calibration data on the memory in association with an identifier of the display. In some examples, the processing of the image to determine the calibration data includes processing the image to determine pixel location data and position-determining pattern location data. In some examples, the processing of the image to determine the calibration data includes comparing the pixel location data and the position-determining pattern location data to determine the calibration data.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method, comprising:
   obtaining an image of a display including a position-determining pattern and pixels, the image including a first image of a target emitted by the display, the target associated with pixel location data, and a second image of the position-determining pattern, the position-determining pattern associated with position-determining pattern location data, the position-determining pattern overlaying the pixels in the first image and the second image, the first image including the target and not including the position-determining pattern, and the second image including the position-determining pattern and not including the target;
   comparing, by executing an instruction with a processor, the pixel location data and the position-determining pattern location data; and
   based on the comparison, determining calibration data that accounts for misalignment between the position-determining pattern and the pixels.

2. The method of claim 1, further including causing the display to be illuminated to enable the position-determining pattern to be detectable in the second image.

3. The method of claim 1, wherein the calibration data is determined for the display prior to a digital pen being connected with the display.

4. The method of claim 1, wherein the comparing of the pixel location data and the position-determining pattern location data includes comparing the first image and the second image.

5. The method of claim 1, wherein the target is to be emitted at a known pixel location on the display.

6. The method of claim 1, further including storing the calibration data on a memory of the display.

7. The method of claim 6, wherein the storing of the calibration data on the memory of the display includes storing the calibration data on the memory in association with an identifier of the display.

8. The method of claim 1, wherein the image is obtained with a first camera different than a second camera of a digital pen, the digital pen to be used with the display.

9. An apparatus, comprising:
a receptacle to receive a display including a position-determining pattern and pixels; and
a camera to be disposed overtop of the display to obtain an image of the display, the image including a first image of a target emitted by the display, the target associated with associated with pixel location data and a second image of the position-determining pattern, the position-determining pattern overlaying the pixels in the first image and the second image, the first image including the target and not including the position-determining pattern, and the second image including the position-determining pattern and not including the target, the image to be processed to determine calibration data that accounts for misalignment between the position-determining pattern and the pixels.

10. The apparatus of claim 9, further including a fixture including the receptacle, the camera being coupled to the fixture.

11. The apparatus of claim 10, wherein the receptacle is movably coupled relative to the camera to enable the display to be positioned within the receptacle.

12. The apparatus of claim 9, wherein the camera is to be disposed overtop of the display at locations to enable the target to be displayed by the display within a field of view of the camera.

13. The apparatus of claim 9, further including a light to illuminate the display to enable the position-determining pattern to be detectable when the second image is obtained.

14. A method, comprising:
disposing a display in a fixture, the display including a position-determining pattern and pixels, the position-determining pattern overlaying the pixels;
causing a calibration process to be performed to generate calibration data that accounts for misalignment between the position-determining pattern and the pixels, wherein causing the calibration process to be performed includes comparing a first image of a target emitted by the display, the target associated with associated with pixel location data, and a second image of the position-determining pattern, the first image including the target and not including the position-determining pattern, and the second image including the position-determining pattern and not including the target; and
removing the display from the fixture.

15. The method of claim 14, wherein causing the calibration process to be performed includes obtaining the first image and the second image using a camera coupled to the fixture.

16. The method of claim 15, further including causing the display to be illuminated to enable the position-determining pattern to be detectable in the second image.

17. The method of 16, wherein the calibration process is performed without use of a digital pen to be used with the display.

18. The method of claim 14, wherein the fixture includes a receptacle to receive the display during the calibration process.

19. The method of claim 1, wherein the target includes a pattern.

20. The apparatus of claim 9, wherein the target includes a pattern.

21. The method of claim 1, wherein the position-determining pattern is defined by a film coupled to the display.

22. The apparatus of claim 9, wherein the position-determining pattern is defined by a film coupled to the display.

* * * * *